United States Patent
Lam et al.

(10) Patent No.: US 9,260,642 B2
(45) Date of Patent: Feb. 16, 2016

(54) SEALANT COMPOSITION AND METHOD OF PREPARING THE SAME

(71) Applicant: Top Alliance Technology Limited, Tortola (VG)

(72) Inventors: Koon Fung Lam, Tuen Mun (HK); Wai Ming Chan, Tseung Kwan O (HK)

(73) Assignee: Top Alliance Technology Limited, Tortola (VG)

( * ) Notice: Subject to any disclaimer, the term of this patent is extended or adjusted under 35 U.S.C. 154(b) by 231 days.

(21) Appl. No.: 14/096,812

(22) Filed: Dec. 4, 2013

(65) Prior Publication Data

US 2015/0152302 A1    Jun. 4, 2015

(51) Int. Cl.
     *C09K 3/12*      (2006.01)
     *B29C 73/16*      (2006.01)
     *B29L 30/00*      (2006.01)

(52) U.S. Cl.
     CPC ............... *C09K 3/12* (2013.01); *B29C 73/163* (2013.01); *B29L 2030/00* (2013.01)

(58) Field of Classification Search
     CPC ............................... C09K 3/12; B29C 73/163
     USPC .................................... 523/166; 524/29, 388
     See application file for complete search history.

(56) References Cited

U.S. PATENT DOCUMENTS

2010/0222455 A1*   9/2010   Dowel ................. B29C 73/163
                                                                             523/166

* cited by examiner

*Primary Examiner* — Edward Cain

(74) *Attorney, Agent, or Firm* — Raymond R. Ferrera; Adams and Reese LLP

(57) ABSTRACT

The present application relates to a sealant composition, comprising 80-95 wt % liquid carrier, 0.1-10 wt % gel material derived from a water soluble polymer, 1-10 wt % latex emulsion, 0.1-5 wt % rigid particles, and 0.1-5 wt % surfactant. The sealant composition can further comprise 0.1-1 wt % additives, such as anti-foaming agent, preservative, anti-corrosion additive, coloring agent and odorant, for corresponding functions. The present application also relates to a method of preparing the sealant composition.

10 Claims, No Drawings

SEALANT COMPOSITION AND METHOD OF PREPARING THE SAME

TECHNICAL FIELD

The present application relates to the field of sealant, and more particularly, relates to a sealant composition for repairing tire punctures and a method of preparing the same.

BACKGROUND

Tires are occasionally punctured by hard objects, such as nails, stones and so on, on road. Flattening of the tires is resulted due to air-leaking through the puncture and may cause serious accident and severe physical injure to the drivers. Liquid tire sealant products can be used for sealing punctures temporarily when the tires are in operation. This provides an emergency measure for drivers to continue the journey and seek for help even after the tire is punctured, which is especially important for vehicles on highway.

In general, a liquid tire sealant mainly consists of sealing materials, a tackifier and a solvent with an anti-freezing agent. The common sealing materials include the latex, the butyl rubber and various particulates. Tackifiers are chemicals used for increasing the tackiness. A common tackifier used for the tire sealant is the resin compound. Anti-freezing agent, such as the ethylene glycol and the propylene glycol, is used to lower the freezing point of the tire sealant in order to prevent the sealant from freezing at a low temperature operating environment.

Various types of the liquid tire sealant are developed in past decades. In the early stage of the tire sealant development, the most common type, such as but not limited to the inventions of EP 1382654A1, U.S. Pat. Nos. 6,992,119 B2 and 0,142, 420 A1, is mainly composed of the butyl rubber and/or the latex emulsion for sealing purpose. The drawbacks of these compositions include their unstable performance (i.e. short shelf-life), odour problem and difficulty to clean up after application.

U.S. Pat. Nos. 4,337,322 and 4588758 describe the further development of the tire sealant. These patents disclose the use of the asbestos fiber, the ethylene glycol and the detergent as main components in the valve-open type sealant. But it is well known that the asbestos fiber is carcinogenic whereas the ethylene glycol is toxic to the environment.

In light of the environmental concerns, a non-petroleum based tire sealant is disclosed in U.S. Pat. No. 5,059,636, and the formulation of this patent includes the ground rubber, the wheat flour and the sodium nitrite. But the drawback of the patent is that the valve core needed to be removed before applying the sealant and it means that the sealant composition in this invention is a valve-open type sealant.

Then a sealant composition based on a mechanism called "log-jam" has received more attention. The "log-jam" mechanism means that particles in the liquid medium accumulate and block at a puncture when the liquid sealant composition flow through the puncture driven by the pressure difference between the inner and outer side of the punctured tire. Each of U.S. Pat. Nos. 5,772,747 and 5,856,376 discloses a sealant composition based on the "log-jam" mechanism, however, the sealant compositions are still valve-open type sealants.

In U.S. Pat. No. 6,013,697, the bentonite clay and the mica are used as the main constituents in the disclosed formulation. These particulates fill the puncture voids and form a clog to prevent a further air leak. The sealant composition disclosed by this patent is a valve-through type sealant that the valve core doesn't need to be removed before applying the sealant composition. The sealant composition is convenient to use, environmentally safe and has a quick sealing performance. However, settling and flocculation of clay platelets are the main issues for this sealant composition.

Other sealant compositions, such as but not limited to U.S. Pat. Nos. 0,077,391 A1, 0129464 A1, 2007/0203260, International Patent WO 2008/022402 A1 and PCT/AU2008/001499, are based on the log jam mechanism and have a lot of innovations on formulations. Advantages of this type of tire sealant include the ease of cleaning after application, free of malodor and longer shelf life. However, this type of tire sealant suffers from a relatively poor sealing performance.

In addition to the "log-jam" mechanism, another type of sealant is based on tackified latex suspension. The latex suspension is a highly viscous liquid that could firmly adhere on the puncture wall and eventually block the air leaking channel. However, disadvantages of the latex-based sealant composition are difficulty to clean after usage, problematic sticky nature, irritation to eyes and skins, use of volatile organic compounds and so on.

BRIEF SUMMARY

The objective of the present application is to provide a sealant composition, which is environmentally friendly, easy to be cleaned after usage, and has insignificant settling, a long shelf-life, and a good sealing performance.

Another objective of the present application is to provide a method of preparing the sealant composition.

With respect to the sealant composition, the technical solutions of the present application for solving the technical problems are as follows:

The present application provides a new enhanced sealant composition based on a combined mechanism of both log-jam and viscous gel clogging principles. The sealant composition comprises 80-95 wt % liquid carrier, 0.1-10 wt % gel material derived from a water soluble polymer, 1-10 wt % latex emulsion, 0.1-5 wt % rigid particles as a fill material, and 0.1-5 wt % surfactant.

In order to broaden the range of the operating temperature of the liquid sealant composition, the liquid carrier includes the water and an anti-freezing agent; the anti-freezing agent includes at least one of the ethylene glycol, the propylene glycol and the glycerol. The sealant composition comprises 5-70 wt % ethylene glycol and/or 5-70 wt % propylene glycol and/or 5-60 wt % glycerol.

The water soluble polymer includes a natural derived water soluble polymer and/or a synthetic water soluble polymer. The sealant composition comprises 1-3 wt % rigid particles as the fill material and sizes of the rigid particles are between 0.05-320 microns. The rigid particles block the punctures, and the gel material derived from the water soluble polymer fills the gaps at the punctures to enhance the sealing performance, and besides the addition of the emulsion latex can further improve the sealing performance of the sealant composition. The latex emulsion includes at least one of the natural latex emulsion, the synthetic latex emulsion, and the modified natural latex emulsion. In order to improve the stability of the latex emulsion component and the wettability and extensibility of the liquid sealant composition in a tire, at least one suitable surfactant can be added.

The sealant composition further comprises 0.1-1 wt % additives for corresponding functions, and the additives includes at least one of an anti-foaming agent, a preservative, an anti-corrosion additive, a coloring agent and an odorant.

The sealant composition further comprises 0.05-3 wt % bentonite to avoid settling.

The viscosity value of the sealant composition is in a range of 19.3-5000 mPas, the pH value of the sealant composition is in a range of 8-10, and the sealant composition functions between −40° C. and 80° C.

The present application provides a method of preparing a sealant composition for sealing tire punctures which is divided into 100 parts in weight, comprising following steps:
- S1: converting a water soluble polymer with an amount of 0.1 to 10 parts into a derived gel material in a liquid carrier with an amount of 80 to 95 parts;
- S2: adding and adequately mixing rigid particles with an amount of 0.1 to 5 parts and a latex emulsion with an amount of 1 to 10 parts into a solution of S1;
- S3: adding a surfactant with an amount of 0.1 to 5 parts into the solution of S2.

While the water soluble polymer in S1 is a chitosan, a method for converting the water soluble polymer into the derived gel material in the liquid carrier comprises following steps:
- S11: adding the chitosan with an amount of 0.1 to 10 parts into the water with an amount of 10 to 60 parts;
- S12: adding an acid into a solution of S11 in order to adjust the PH value of the solution to 0-5;
- S13: after the absolute dissolution of the chitosan, adding an alkali into the solution to adjust the PH value of the solution to 8-10, and thus obtaining the derived gel material.

When implementing the sealant composition of the present application, the following advantageous effects can be achieved. The sealant composition is environmentally friendly, nontoxic, and able to effectively and instantly seal tire punctures. Since the sizes of punctures being sealed depend on the sizes and amount of particles in the solid contents of the sealant composition, the sealant composition can seal a puncture caused by a spike with a diameter of at least 6.35 mm. The sealant composition is a valve-through type sealant that can be applied conveniently without removing the valve core before injection. The functional temperature is between −40° C. and 80° C. And the sealing effect maintains between 12 to 48 hours or longer, depending on the exact sealant composition. Besides, the applied sealant composition can be easily cleaned by water after usage.

DETAILED DESCRIPTION OF THE PREFERRED EMBODIMENTS

In order to make the technical features, the propose and the technical effect of the present application more clearly, the present application will now be described in detail with reference to the accompanying embodiments.

The present application discloses a new enhanced sealant composition based on a combined mechanism of both logjam and viscous gel clogging principles. The sealant composition for sealing tire punctures comprises 80-95 wt % liquid carrier, 0.1-10 wt % gel material derived from a water soluble polymer, 1-10 wt % latex emulsion, 0.1-5 wt % rigid particles as a fill material, and 0.1-5 wt % surfactant.

In order to prepare the sealant composition that is divided into 100 parts in weight, the detailed preparing steps are as follows:
- S1: converting the water soluble polymer with an amount of 0.1 to 10 parts into the derived gel material in the liquid carrier with an amount of 80 to 95 parts;
- S2: adding and adequately mixing the rigid particles with an amount of 0.1 to 5 parts and the latex emulsion with an amount of 1 to 10 parts into a solution of S1;
- S3: adding and adequately mixing the surfactant with an amount of 0.1 to 5 parts and the additives with an amount of 0.1 to 1 parts into a solution of S2.

Preferably, the method for preparing the sealant composition comprises:
- S1': converting the water soluble polymer with an amount of 1 to 10 parts into the derived gel material in the water with an amount of 10 to 60 parts;
- S2': adding and adequately mixing the anti-freezing agent, the rigid particles with an amount of 0.1 to 5 parts and the latex emulsion with an amount of 1 to 10 parts into a solution of S1';
- S3': adding and adequately mixing the surfactant with an amount of 0.1 to 5 parts and the additives with an amount of 0.1 to 1 parts into a solution of S2'.

The water soluble polymer of the present application can be a natural derived water soluble polymer, such as the chitosan, the sodium alginate, the sericin and so on; and the water soluble polymer can also be a synthetic water soluble polymer, such as the polyvinyl alcohol and so on. The water soluble polymers above can be converted into flexible gel materials by physical or chemical methods.

In a preferred embodiment, the chitosan is used as the water soluble polymer for preparing the gel material. The chitosan is obtained by deacetylation of the chitin which is commonly found in the exoskeleton of crustaceans. The original form of the chitosan exists in rigid flakes which can be dissolved in an acidic medium. The acid can be any kind of acid, preferably the acetic acid and the hydrochloric acid due to their low toxicity. The chitosan rigid flakes are put into the acidic medium; prior to the dissolution of the chitosan, any kind of alkali, preferably the sodium hydroxide, is added to obtain the chitosan after the chitosan is re-precipitated under the neutralization.

Preferably, the sealant composition is divided into 100 parts, and the method for converting the water soluble polymer into the derived gel material in the liquid carrier includes:
- S11: adding the chitosan with an amount of 0.1 to 10 parts into the water with an amount of 10 to 60 parts;
- S12: adding an appropriate amount of an acid, preferably the acetic acid, into a solution of S11 in order to adjust the PH value of the solution to 0-5;
- S13: adding and adequately mixing an appropriate amount of an alkali, preferably the sodium hydroxide, into the solution after the absolute dissolution of the chitosan, in order to adjust the PH value of the solution to 8-10, and thus obtaining the derived gel material.

The re-precipitated chitosan has a different particle structure from its original form. The re-precipitated chitosan appears as soft, semi-transparent and flexible gel material suspending in the aqueous medium. The exact particle size and rigidity of the gel material are controlled by varying the rate of neutralization, the final pH of the solution and the applied shearing force during mixing or homogenization process. In the preferred embodiments, the water soluble polymer is the chitosan, the particle size and rigidity of the gel material are controlled by varying the applied shearing force during mixing or homogenization process, so as to enable the gel material to pass a sieve of sixty meshes. The obtained sealant composition includes 0.1-10 wt % re-precipitated chitosan that is made by dissolving chitosan particles with 50-500 microns under an acid condition, in which case the final PH value of the liquid suspension is between 7 and 10.

According to the combined mechanism of the sealant composition, other similar water soluble materials, such as the sodium alginate, the sericin and the polyvinyl alcohol, which can exist as gel materials in the given liquid medium are also used for preparing the sealant composition. Wherein, the polyvinyl alcohol as a synthetic water soluble polymer can also be used for producing the gel material, and the producing method comprises: dissolving the polyvinyl alcohol in the warm water; obtaining the derived gel material by making the polyvinyl alcohol act with a suitable chemical reactant, such as the sodium dodecyl sulfate (SDS) or the sodium silicate and so on, at a controllable condition.

For improving the sealing performance of the sealant composition and strengthening the gel material derived from the water soluble polymer, other reinforcement materials, such as rigid particles, chemical compounds of calcium, magnesium and other metal ions, can be added to the sealant composition. To further improve the sealing performance, some natural and/or synthetic latex emulsions can also be added to the sealant composition. Modified natural latex emulsions, such as the deproteinized latex and the latex with phosphorus and ion removal, are also applicable for the present application. The sealant composition includes 1-10 wt % latex emulsion, and the percentage of the latex emulsion in the present sealant composition is much lower than the percentage of the latex emulsion in the conventional latex-based tire sealant in the market. In the experimental stage, while the latex emulsion content of the sealant composition is 0 wt % and other components are similar to the preferred embodiments, valve-through ability of the sealant composition is "good", which means the success rate is greater than 90%, but the sealing ability is "fair", which means the success rate is just greater than 50%. Compared with the preferred embodiments, the addition of the latex emulsion can obviously improve the sealing ability of the sealant composition to be "good". Thus the latex emulsion is an important component of the sealant composition in the present application for obviously improving the sealing ability of the sealant composition.

In most of the preferred embodiments, the sealant composition contains rigid chitosan particles in an amount of 0.1-5 wt %, and mostly preferably between 1-3 wt %. The particle sizes of the rigid chitosan particles are between 5-320 microns, preferably between 5-100 microns. The rigid particles in the sealant composition are not limited to the chitosan particles, other solid particles with the particle size ranging from 0.05 micron to 320 microns are used in the present application. In the following examples, the cenosphere, the silica, the wollastonite, the diatomite, the kaolinite, the mica, the ground tire rubber, the mesoporous silica and the colloidal silica can be used for preparing the sealant composition. The rigid particles are preferably to have specific gravity lower than 1.5 for the low settling rate, though the rigid particles with higher density can also be used. Furthermore, 0.05-3 wt % bentonite is used to avoid settling and sedimentation problems occurred in the sealant composition.

During the sealing process, the rigid particles accumulate in the puncture based on the log-jam mechanism. A plug formed by the jammed rigid particles combined with the soft, flexible gel materials in the solution to provide superior sealing performance to the puncture. The gel materials and the rigid particles are compatible without observable chemical reaction. In the embodiment, since both the re-precipitated chitosan and the rigid chitosan are from the same source, their compatibility in the sealing mechanism is excellent. The added latex emulsion further improves the sealing performance by forming latex rubber at the tire puncture.

The sealant composition comprises 80-95 wt % liquid carrier, and the liquid carrier is mainly consisted of the water and the anti-freezing agent. The sealant composition comprises 10-60 wt % water, and the liquid carrier provides a medium for suspending the gel material derived from water soluble polymer and the rigid particles; the liquid carrier is also used for dissolving various additives. The anti-freezing agent added in the liquid carrier may be the ethylene glycol, the propylene glycol, the glycerol and so on, and the anti-freezing agent is added in the liquid carrier to broaden the applicability of the sealant composition. In the present application, at least one kind of the above anti-freezing agents or a mixture of them can be used to depress the freezing point of the liquid carrier. In the preferred embodiments, the anti-freezing agent of the sealant composition comprises at least one kind of the following components: 5-70 wt % ethylene glycol, 5-70 wt % propylene glycol and 5-60 wt % glycerol. The anti-freezing agent consisted of at least one of the ethylene glycol, the glycerol, the 1,2-propylene glycol and the 1,3-propylene glycol, can reduce the freezing point of the sealant composition to −40° C. (referred to the preferred embodiment 3). The functional temperature of the sealant composition is between −40° C. and 80° C. 1-10 wt % inorganic salts such as the calcium chloride or the magnesium chloride can also be added for controlling the operating temperature of the sealant composition, too.

The sealant composition comprises 0.1-5 wt % surfactant, and at least one kind of appropriate surfactant can be added to improve the stability and the functionality of the sealant composition. The surfactant can be an anionic surfactant, a cationic surfactant, or a non-ionic surfactant, and the type of the surfactant is chosen depended on the type of the latex emulsion added to the sealant composition. In the preferred embodiments, at least one kind of the surfactants can be selected from Tween-20 to Tween-85, SDS, cetyl trimethylammonium bromide and so on.

The sealant composition can further comprise 0.1-1 wt % other additives for corresponding functions. The other additives are selectively added according to the requirements of the specific function and the sealing performance of the sealant composition is not affected by the added additives. Tackifier is added for both controlling the viscosity of the solution and improving the adhesion of the rigid particles and the gel material to the tire puncture wall. Preservative are added to extend the shelf-life of the sealant composition and anti-corrosion additive may be added to prevent the occurrence of rusting. Zinc oxide or titanium oxide is added to prevent from the decomposition under sunlight exposure. Various coloring agents and odorants can be applied provided that they do not pose any adverse effect on the sealant composition properties.

In the preferred embodiments, the sealant composition contains 0.1-1 wt % preservative for preserving the bio-degradable components in the sealant composition formula to extend the shelf-life of the sealant composition up to five years or more. Anti-foaming agent is optionally added with less than 0.5 wt % to avoid foaming. Furthermore, without affecting the performance of the sealant, 0.1-1 wt % anti-corrosion additive is added to the sealant composition to prevent occurrence of rusting inside the tire.

The viscosity value of the prepared sealant composition is in a range of 19.3-5000 mPas; the pH value of the prepared sealant composition is in a range of 7-11, preferably in a range of 8-10. The sealant composition has insignificant settling within 24 hours due to the presence of the gel material and the bentonite. The use of the rigid particles with low density such as cenosphere also resolves the settling problem.

In operation, the prepared sealant composition is injected into a tire through a hose under a high pressure, preferably 3-7 bar, with or without removing the valve core. When there is no puncture, the sealant composition liquid is kept mixing in the rotating tire without any significant physical and chemical changes. In addition, the sealant composition is able to spread inside the tire efficiently so that puncture occurred at shoulder area can also be sealed.

The sealant composition performance is tested by injecting at least 300 ml of the prepared sealant composition into a 165/60 R14 aged tires through a hose under high pressure, preferably 3-7 bar, with or without removing the valve core. It is worth noting that the volume of sealant composition injected can be less than 300 ml. However, 300 ml is used as a benchmark in the tests. In the actual test, a puncture is made on the tire using a typically 6.35 mm spike before or during the rotation. Understandably, 6.35 mm is also used as a benchmark in the tests, and spikes with other sizes are also tested.

The tested tire is installed to a vehicle followed by injecting the prepared sealant composition into the tire. The vehicle is then driven to run for less than 20 km. The air leakage through the puncture is checked every 3-5 km by measuring the inner tire pressure in order to record the sealing performance. The pressure drop less than 0.1 bar is indicated successful, that means the prepared sealant composition has immediately sealed the tire puncture. After taking off the tire, the inner tire pressure is kept stationary with the puncture location pointing upwards. The pressure drop is re-measured again after 24 or 48 hours to confirm the sealing performance.

The preferred embodiments of the present application will now be illustrated in further detail by reference to the following examples, but they should not be construed as being limited to these examples.

In the following preferred embodiments, "good" for the valve-through ability and the sealing ability of the sealant composition means the success rate is greater than 90%, "fair" means the success rate is just greater than 50%, and "poor" means the success rate is lower than 50%.

Preferred Embodiment 1: In the preparation of the sealant composition 1 that is divided into 100 parts in weight, the composition includes: the water with an amount of 38.4 parts; the anti-freezing agent which is consisted of the 1,2-propylene glycol with an amount of 39.4 parts and the glycerol with an amount of 11.7 parts; the gel material (i.e. the re-precipitated chitosan) converted from the water soluble polymer chitosan with an amount of 1.1 parts, the acetic acid with an amount of 0.3 parts and the sodium hydroxide with an amount of 1.3 parts; the rigid particles consisted of the silica with an amount of 0.5 parts and the mica with an amount of 0.1 parts; the solid latex with an amount of 4.5 parts; the surfactant with an amount of 2.3 parts; the additives consisted of the preservative with an amount of 0.2 parts, the anti-foaming agent with an amount of 0 to 0.2 parts; and the bentonite with an amount of 0.2 parts. Performance parameters of the prepared sealant composition 1: the freezing point is −30° C., the PH value is 9.27, the viscosity value at 25±5° C. is 29.0 mPas, the valve-through ability and the sealing ability are "good".

Preferred Embodiment 2: In the preparation of the sealant composition 2 that is divided into 100 parts in weight, the composition includes: the water with an amount of 38.4 parts; the 1,2-propylene glycol with an amount of 51 parts; the gel material converted from the chitosan with an amount of 1.1 parts, the acetic acid with an amount of 0.3 parts and the sodium hydroxide with an amount of 1.3 parts; the rigid particles consisted of the silica with an amount of 0.5 parts and the mica with an amount of 0.1 parts; the solid latex with an amount of 4.5 parts; the surfactant with an amount of 2.3 parts; the additives consisted of the preservative with an amount of 0.2 parts, the anti-foaming agent with an amount of 0 to 0.2 parts; and the bentonite with an amount of 0.2 parts. Performance parameters of the prepared sealant composition 2: the freezing point is −30° C., the PH value is 9.30, the viscosity value at 25±5° C. is 51.7 mPas, the valve-through ability and the sealing ability are "good".

Preferred Embodiment 3: In the preparation of the sealant composition 3 that is divided into 100 parts in weight, the composition includes: the water with an amount of 27.4 parts; the 1,2-propylene glycol with an amount of 61 parts; the gel material converted from the chitosan with an amount of 1.1 parts, the acetic acid with an amount of 0.3 parts and the sodium hydroxide with an amount of 1.3 parts; the rigid particles consisted of the silica with an amount of 0.5 parts and the mica with an amount of 0.1 parts; the solid latex with an amount of 4.5 parts; the surfactant with an amount of 2.3 parts; the additives consisted of the preservative with an amount of 0.2 parts, the anti-foaming agent with an amount of 0 to 0.2 parts; and the bentonite with an amount of 0.2 parts. Performance parameters of the prepared sealant composition 3: the freezing point is −40° C., the PH value is 9.28, the viscosity value at 25±5° C. is 78.5 mPas, the valve-through ability and the sealing ability are "good".

Preferred Embodiment 4: In the preparation of the sealant composition 4 that is divided into 100 parts in weight, the composition includes: the water with an amount of 38.4 parts; the ethylene glycol with an amount of 51 parts; the gel material converted from the chitosan with an amount of 1.1 parts, the acetic acid with an amount of 0.3 parts and the sodium hydroxide with an amount of 1.3 parts; the rigid particles consisted of the silica with an amount of 0.5 parts and the mica with an amount of 0.1 parts; the solid latex with an amount of 4.5 parts; the surfactant with an amount of 2.3 parts; the additives consisted of the preservative with an amount of 0.2 parts, the anti-foaming agent with an amount of 0 to 0.2 parts; and the bentonite with an amount of 0.2 parts. Performance parameters of the prepared sealant composition 4: the freezing point is −30° C., the PH value is 9.19, the viscosity value at 25±5° C. is 23.1 mPas, the valve-through ability and the sealing ability are "good".

Preferred Embodiment 5: In the preparation of the sealant composition 5 that is divided into 100 parts in weight, the composition includes: the water with an amount of 38.5 parts; the anti-freezing agent which is consisted of the 1,2-propylene glycol with an amount of 39.6 parts and the ethylene glycol with an amount of 5 parts; the gel material converted from the chitosan with an amount of 1.3 parts, the acetic acid with an amount of 0.3 parts and the sodium hydroxide with an amount of 1.5 parts; the rigid particles consisted of the silica with an amount of 0.5 parts and the mica with an amount of 0.1 parts; the solid latex with an amount of 4.5 parts; the surfactant with an amount of 2.8 parts; the additives consisted of the preservative with an amount of 0.2 parts, the anti-foaming agent with an amount of 0 to 0.2 parts; and the bentonite with an amount of 0.2 parts. Performance parameters of the prepared sealant composition 5: the freezing point is −30° C., the PH value is 9.43, the viscosity value at 25±5° C. is 29.3 mPas, the valve-through ability and the sealing ability are "good".

Preferred Embodiment 6: In the preparation of the sealant composition 6 that is divided into 100 parts in weight, the composition includes: the water with an amount of 38.4 parts and the anti-freezing agent which is consisted of the 1,3-propylene glycol with an amount of 40 parts and the glycerol with an amount of 11 parts; the gel material converted from the chitosan with an amount of 1.1 parts, the acetic acid with an amount of 0.3 parts and the sodium hydroxide with an amount of 1.3 parts; the rigid particles consisted of the silica with an amount of 0.5 parts and the mica with an amount of 0.1 parts; the solid latex with an amount of 4.5 parts; the surfactant with an amount of 2.3 parts; the additives consisted of the preservative with an amount of 0.2 parts, the anti-foaming agent with an amount of 0 to 0.2 parts; and the bentonite with an amount of 0.2 parts. Performance parameters of the prepared sealant composition 6: the freezing point is −30° C., the PH value is 9.65, the viscosity value at 25±5° C. is 19.3 mPas, the valve-through ability and the sealing ability are "good".

Preferred Embodiment 7: In the preparation of the sealant composition 7 that is divided into 100 parts in weight, the composition includes: the water with an amount of 38.4 parts; the anti-freezing agent which is consisted of the 1,2-propylene glycol with an amount of 41.6 parts and the 1,3-propylene glycol with an amount of 10.4 parts; the gel material converted from the chitosan with an amount of 1.1 parts, the acetic acid with an amount of 0.3 parts and the sodium hydroxide with an amount of 1.3 parts; the rigid particles consisted of the silica with an amount of 0.5 parts and the mica with an amount of 0.1 parts; the solid latex with an amount of 4.5 parts; the surfactant with an amount of 2.3 parts; the additives consisted of the preservative with an amount of 0.2 parts, the anti-foaming agent with an amount of 0 to 0.2 parts; and the bentonite with an amount of 0.2 parts. Performance parameters of the prepared sealant composition 7: the freezing point is −30° C., the PH value is 9.32, the viscosity value at 25±5° C. is 26.2 mPas, the valve-through ability and the sealing ability are "good".

Comparing the preferred embodiments 1 to 7, except the significant changes on contents and components of the anti-freezing agents, other components of the sealant compositions 1 to 7 are nearly the same and just have some slight changes on contents. In the present application, the anti-freezing agent can be at least one of the ethylene glycol, the glycerol, the 1,2-propylene glycol and the 1,3-propylene glycol. Wherein, if the sealant composition is divided into 100 parts in weight, the sealant composition may comprise the ethylene glycol with an amount of 5 to 70 parts, the propylene glycol with an amount of 5 to 70 parts which may include at least of the 1,2-propylene glycol and the 1,3-propylene glycol, the glycerol with an amount of 5 to 60 parts. In the preferred embodiment 3, the liquid carrier includes the water with an amount of 27.4 parts and the 1,2-propylene glycol with an amount of 61 parts, other components of the sealant composition 3 is totally as the same as the components of the sealant composition 2; however, the freezing point of the sealant composition 3 is lowered to −40° C., the viscosity value at 25±5° C. is increased to 78.5 mPas, the valve-through ability and sealing ability are still "good".

Preferred Embodiment 8: In the preparation of the sealant composition 8 that is divided into 100 parts in weight, the composition includes: the water with an amount of 37 parts; the anti-freezing agent which is consisted of the propylene glycol with an amount of 39.4 parts and the glycerol with an amount of 11.7 parts; the gel material converted from the water soluble polymer chitosan with an amount of 1.1 parts, the acetic acid with an amount of 0.3 parts and the sodium hydroxide with an amount of 1.3 parts; the rigid particles consisted of the silica with an amount of 0.5 parts and the mica with an amount of 0.1 parts; the solid latex with an amount of 2.2 parts; the surfactant with an amount of 2.3 parts; the additives consisted of the preservative with an amount of 0.2 parts, the anti-foaming agent with an amount of 0 to 0.2 parts; and the bentonite with an amount of 0.2 parts. Performance parameters of the prepared sealant composition 8: the freezing point is −30° C., the PH value is 9.08, the viscosity value at 25±5° C. is 35.6 mPas, the valve-through ability and the sealing ability are "good".

Preferred Embodiment 9: In the preparation of the sealant composition 9 that is divided into 100 parts in weight, the composition includes: the water with an amount of 38.4 parts; the anti-freezing agent which is consisted of the propylene glycol with an amount of 39.4 parts and the glycerol with an amount of 11.7 parts; the gel material converted from the chitosan with an amount of 1.1 parts, the acetic acid with an amount of 0.3 parts and the sodium hydroxide with an amount of 1.3 parts; the rigid particles consisted of the silica with an amount of 0.5 parts and the mica with an amount of 0.1 parts; the solid latex with an amount of 4.5 parts; the surfactant with an amount of 2.3 parts; the additives consisted of the preservative with an amount of 0.2 parts, the anti-foaming agent with an amount of 0 to 0.2 parts; and the bentonite with an amount of 0.2 parts. Performance parameters of the prepared sealant composition 9: the freezing point is −30° C., the PH value is 9.27, the viscosity value at 25±5° C. is 29 mPas, the valve-through ability and the sealing ability are "good".

Preferred Embodiment 10: In the preparation of the sealant composition 10 that is divided into 100 parts in weight, the composition includes: the water with an amount of 34.3 parts; the anti-freezing agent which is consisted of the propylene glycol with an amount of 39.2 parts and the glycerol with an amount of 11.6 parts; the gel material converted from the chitosan with an amount of 1.1 parts, the acetic acid with an amount of 0.3 parts and the sodium hydroxide with an amount of 1.3 parts; the rigid particles consisted of the silica with an amount of 0.5 parts and the mica with an amount of 0.1 parts; the solid latex with an amount of 8.9 parts; the surfactant with an amount of 2.3 parts; the additives consisted of the preservative with an amount of 0.2 parts, the anti-foaming agent with an amount of 0 to 0.2 parts; and the bentonite with an amount of 0.2 parts. Performance parameters of the prepared sealant composition 10: the freezing point is −30° C., the PH value is 9.61, the viscosity value at 25±5° C. is 52.7 mPas, the valve-through ability and the sealing ability are "good".

Comparing the preferred embodiments 8 to 10, except the significant changes on contents of the solid latex, other components of the sealant compositions 8 to 10 are totally the same and just have some slight changes on contents. The sealant composition 8 includes the solid latex with an amount of 2.2 parts and its viscosity value is 35.6 mPas; the sealant composition 9 includes the solid latex with an amount of 4.5 parts and its viscosity value is 29 mPas; the sealant composition 10 includes the solid latex with an amount of 8.9 parts and its viscosity value is 52.7 mPas. The valve-through ability and the sealing ability of the three preferred embodiments are all "good".

Preferred Embodiment 11: In the preparation of the sealant composition 11 that is divided into 100 parts in weight, the composition includes: the water with an amount of 38.3 parts; the anti-freezing agent which is consisted of the propylene glycol with an amount of 43.2 parts and the ethylene glycol with an amount of 5.7 parts; the gel material converted from the water soluble polymer chitosan with an amount of 1.4 parts, the acetic acid with an amount of 0.4 parts and the sodium hydroxide with an amount of 1.6 parts; the rigid particles consisted of the silica with an amount of 0.6 parts and the mica with an amount of 0.1 parts; the solid latex with an amount of 5.5 parts; the surfactant with an amount of 2.8 parts; the additives consisted of the preservative with an amount of 0.2 parts, the anti-foaming agent with an amount of 0 to 0.2 parts; and the bentonite with an amount of 0.2 parts. Performance parameters of the prepared sealant composition 11: the freezing point is −30° C., the PH value is 9.01, the viscosity value at 25±5° C. is 28.3 mPas, the valve-through ability and the sealing ability are "good".

Preferred embodiment 12: In the preparation of the sealant composition 12 that is divided into 100 parts in weight, the composition includes: the water with an amount of 38.1 parts; the anti-freezing agent which is consisted of the propylene glycol with an amount of 43 parts and the ethylene glycol with an amount of 5.7 parts; the gel material converted from the chitosan with an amount of 1.4 parts, the acetic acid with an amount of 0.4 parts and the sodium hydroxide with an amount of 1.6 parts; the rigid particles consisted of the silica with an amount of 0.6 parts, the mica with an amount of 0.1 parts and the cenosphere with an amount of 0.6 parts; the solid latex with an amount of 5.4 parts; the surfactant with an amount of 2.8 parts; the additives consisted of the preservative with an amount of 0.2 parts, the anti-foaming agent with an amount of 0 to 0.2 parts; and the bentonite with an amount of 0.2 parts. Performance parameters of the prepared sealant composition 12: the freezing point is −30° C., the PH value is 8.97, the viscosity value at 25±5° C. is 27.1 mPas, the valve-through ability and the sealing ability are "good".

Preferred Embodiment 13: In the preparation of the sealant composition 13 that is divided into 100 parts in weight, the composition includes: the water with an amount of 37.9 parts; the anti-freezing agent which is consisted of the propylene glycol with an amount of 42.7 parts and the ethylene glycol with an amount of 5.6 parts; the gel material converted from the chitosan with an amount of 1.3 parts, the acetic acid with an amount of 0.4 parts and the sodium hydroxide with an amount of 1.6 parts; the rigid particles consisted of the silica with an amount of 0.6 parts, the mica with an amount of 0.1 parts and the cenosphere with an amount of 1.2 parts; the solid latex with an amount of 5.4 parts; the surfactant with an amount of 2.8 parts; the additives consisted of the preservative with an amount of 0.2 parts, the anti-foaming agent with an amount of 0 to 0.2 parts; and the bentonite with an amount of 0.2 parts. Performance parameters of the prepared sealant composition 13: the freezing point is −30° C., the PH value is 8.90, the viscosity value at 25±5° C. is 31.1 mPas, the valve-through ability and the sealing ability are "good".

Preferred Embodiment 14: In the preparation of the sealant composition 14 that is divided into 100 parts in weight, the composition includes: the water with an amount of 38.1 parts; the anti-freezing agent which is consisted of the propylene glycol with an amount of 43 parts and the ethylene glycol with an amount of 5.7 parts; the gel material converted from the chitosan with an amount of 1.4 parts, the acetic acid with an amount of 0.4 parts and the sodium hydroxide with an amount of 1.6 parts; the rigid particles consisted of the silica with an amount of 0.6 parts, the mica with an amount of 0.1 parts and the ground tire rubber with an amount of 0.6 parts; the solid latex with an amount of 5.4 parts; the surfactant with an amount of 2.8 parts; the additives consisted of the preservative with an amount of 0.2 parts, the anti-foaming agent with an amount of 0 to 0.2 parts; and the bentonite with an amount of 0.2 parts. Performance parameters of the prepared sealant composition 14: the freezing point is −30° C., the PH value is 8.97, the viscosity value at 25±5° C. is 27.1 mPas, the valve-through ability and the sealing ability are "good".

Comparing the preferred embodiments 11 to 14, except the significant changes on contents and components of the rigid particles, other components of the sealant compositions 11 to 14 are nearly the same and just have some slight changes on contents. In the present application, the sealant composition comprises 0.1-5 wt % rigid particles, and the particle sizes ranging from 0.05 micron to 320 microns are used. In the sealant composition 11, the rigid particles consisted of the silica with an amount of 0.6 parts and the mica with an amount of 0.1 parts. In the sealant composition 12, the cenosphere with an amount of 0.6 parts is added to the rigid particles. In the sealant composition 13, the rigid particles consisted of the silica with an amount of 0.6 parts, the mica with an amount of 0.1 parts and the cenosphere with an amount of 1.2 parts. In the sealant composition 14, the rigid particles consisted of the silica with an amount of 0.6 parts, the mica with an amount of 0.1 parts and the ground tire rubber with an amount of 0.6 parts. Valve-through ability and sealing ability of preferred embodiments 11 to 14 are all "good".

Embodiment 15: In the preparation of the sealant composition 15 that is divided into 100 parts in weight, the composition includes: the water with an amount of 60 parts; the anti-freezing agent which is consisted of the 1,3-propylene glycol with an amount of 30 parts and the glycerol with an amount of 5 parts; the gel material converted from the water soluble polymer chitosan with an amount of 0.1 parts, the acetic acid with an amount of 0.2 parts and the sodium hydroxide with an amount of 0.7 parts; the mica with an amount of 0.1 parts as the rigid particles; the solid latex with an amount of 3 parts; the surfactant with an amount of 0.7 parts; the additives consisted of the preservative with an amount of 0.05 parts, the anti-foaming agent with an amount of 0.1 parts; and the bentonite with an amount of 0.05 parts. Performance parameters of the prepared sealant composition 15: the PH value is 8, the viscosity value at 25±5° C. is 120 mPas, the valve-through ability and the sealing ability are "good".

Embodiment 16: In the preparation of the sealant composition 16 that is divided into 100 parts in weight, the composition includes: the water with an amount of 10 parts; the 1,2-propylene glycol with an amount of 70 parts; the gel material converted from the water soluble polymer chitosan with an amount of 6.9 parts, the acetic acid with an amount of 1 parts and the sodium hydroxide with an amount of 2.2 parts; the rigid particles consisted of the silica with an amount of 2.5 parts and the mica with an amount of 2.5 parts; the solid latex with an amount of 1 parts; the surfactant with an amount of 0.1 parts; the preservative with an amount of 1 parts; the bentonite with an amount of 2.8 parts. Performance parameters of the prepared sealant composition 16: the PH value is 10, the viscosity value at 25±5° C. is 4989 mPas, the valve-through ability and the sealing ability are "good".

Embodiment 17: In the preparation of the sealant composition 17 that is divided into 100 parts in weight, the composition includes: the water with an amount of 16.2 parts; the anti-freezing agent which is consisted of the 1,3-propylene glycol with an amount of 5 parts and the glycerol with an amount of 60 parts; the gel material converted from the water soluble polymer chitosan with an amount of 1 parts, the acetic acid with an amount of 0.5 parts and the sodium hydroxide with an amount of 0.9 parts; the rigid particles consisted of the silica with an amount of 0.1 parts and the mica with an amount of 0.5 parts; the solid latex with an amount of 10 parts; the surfactant with an amount of 5 parts; the additives consisted of the preservative with an amount of 0.6 parts; and the bentonite with an amount of 0.2 parts. Performance parameters of the prepared sealant composition 17: the PH value is 9.2, the viscosity value at 25±5° C. is 890 mPas, the valve-through ability and the sealing ability are "good".

Embodiment 18: In the preparation of the sealant composition 18 that is divided into 100 parts in weight, the composition includes: the water with an amount of 10 parts; the ethylene glycol with an amount of 70 parts; the gel material converted from the water soluble polymer chitosan with an amount of 10 parts, the acetic acid with an amount of 1.4 parts and the sodium hydroxide with an amount of 2.4 parts; the rigid particles consisted of the silica with an amount of 2.5 parts and the mica with an amount of 2.5 parts; the solid latex with an amount of 1 parts; the surfactant with an amount of 0.1 parts; the additives consisted of the preservative with an amount of 0.05 parts and the anti-foaming agent with an amount of 0.05 parts. Performance parameters of the prepared sealant composition 18: the PH value is 10, the viscosity value at 25±5° C. is 5000 mPas, the valve-through ability and the sealing ability are "good".

The embodiments 15 to 18 comprise some extreme content values of the sealant composition in the present application. In the sealant composition 15, the liquid carrier with an amount of 95 parts includes the water with an amount of 60 parts, the 1,3-propylene glycol with an amount of 30 parts and the glycerol with an amount of 5 parts; the water soluble polymer chitosan with an amount of 0.1 parts; the rigid particles with an amount of 0.1 parts; the bentonite with an amount of 0.05 parts; the PH value of the prepared sealant composition is 8. In the sealant composition 16, the liquid carrier with an amount of 80 parts includes the water with an amount of 10 parts, the propylene glycol with an amount of 70 parts; the rigid particles with an amount of 5 parts, the solid latex with an amount of 1 parts, the surfactant with an amount of 0.1 parts and the additives with an amount of 1 parts; the PH value of the prepared sealant composition is 10. In the sealant composition 17, the anti-freezing agent is consisted of the 1,3-propylene glycol with an amount of 5 parts and the glycerol with an amount of 60 parts; the solid latex with an amount of 10 parts and the surfactant with an amount of 5 parts. In the sealant composition 18, the anti-freezing agent is the ethylene glycol with an amount of 70 parts, the water soluble polymer chitosan is with an amount of 10 parts, the additives is with an amount of 0.1 parts and viscosity value is 5000 mPas. The valve-through ability and the sealing ability of the prepared sealant compositions 15 to 18 are still "good".

The invention claimed is:

1. A sealant composition for sealing tire punctures, comprising 80-95 wt % liquid carrier, 0.1-10 wt % gel material derived from a water soluble polymer, 1-10 wt % latex emulsion, 0.1-5 wt % rigid particles as a fill material, and 0.1-5 wt % surfactant.

2. The sealant composition according to claim 1, wherein the liquid carrier includes water and an anti-freezing agent; the anti-freezing agent includes at least one of the ethylene glycol, the propylene glycol and the glycerol.

3. The sealant composition according to claim 2, wherein the sealant composition comprises 5-70 wt % ethylene glycol and/or 5-70 wt % propylene glycol and/or 5-60 wt % glycerol.

4. The sealant composition according to claim 1, wherein the water soluble polymer includes a natural derived water soluble polymer and/or a synthetic water soluble polymer.

5. The sealant composition according to claim 1, wherein the sealant composition comprises 1-3 wt % rigid particles and the sizes of the rigid particles are between 0.05-320 microns.

6. The sealant composition according to claim 1, wherein the sealant composition further comprises 0.1-1 wt % additives, and the additives includes at least one of an anti-foaming agent, a preservative, an anti-corrosion additive, a coloring and an odorant.

7. The sealant composition according to claim 1, wherein the sealant composition further comprises 0.05-3 wt % bentonite.

8. The sealant composition according to claim 1, wherein the viscosity value of the sealant composition is in a range of 19.3-5000 mPas, the pH value of the sealant composition is in a range of 8-10, and the sealant composition functions between −40° C. and 80° C.

9. A method of preparing a sealant composition for sealing tire punctures which is divided into 100 parts in weight, the method comprising following steps:
   S1: converting a water soluble polymer with an amount of 0.1 to 10 parts into a derived gel material in a liquid carrier with an amount of 80 to 95 parts;
   S2: adding and adequately mixing rigid particles with an amount of 0.1 to 5 parts and a latex emulsion with an amount of 1 to 10 parts into a solution of S1;
   S3: adding a surfactant with an amount of 0.1 to 5 parts into a composition of S2.

10. The method of preparing the sealant composition according to claim 9, wherein while the water soluble polymer in S1 is a chitosan, a method for converting the water soluble polymer into the derived gel material in the liquid carrier comprises following steps:
   S11: adding the chitosan with an amount of 0.1 to 10 parts into the water with an amount of 10 to 60 parts;
   S12: adding an acid into a solution of S11 in order to adjust the PH value of the solution to 0-5;
   S13: after the absolute dissolution of the chitosan, adding an alkali into the solution of S12 in order to adjust the PH value of the solution to 8-10, and thus obtaining the derived gel material.

* * * * *